Nov. 9, 1965    W. A. SCHAICH    3,217,072
METHOD FOR MAKING PLASTIC ARTICLES
Original Filed Aug. 14, 1961    3 Sheets-Sheet 1

INVENTOR.
WILBUR A. SCHAICH
BY Philip M. Rice
& W. A. Schaich
ATTORNEYS

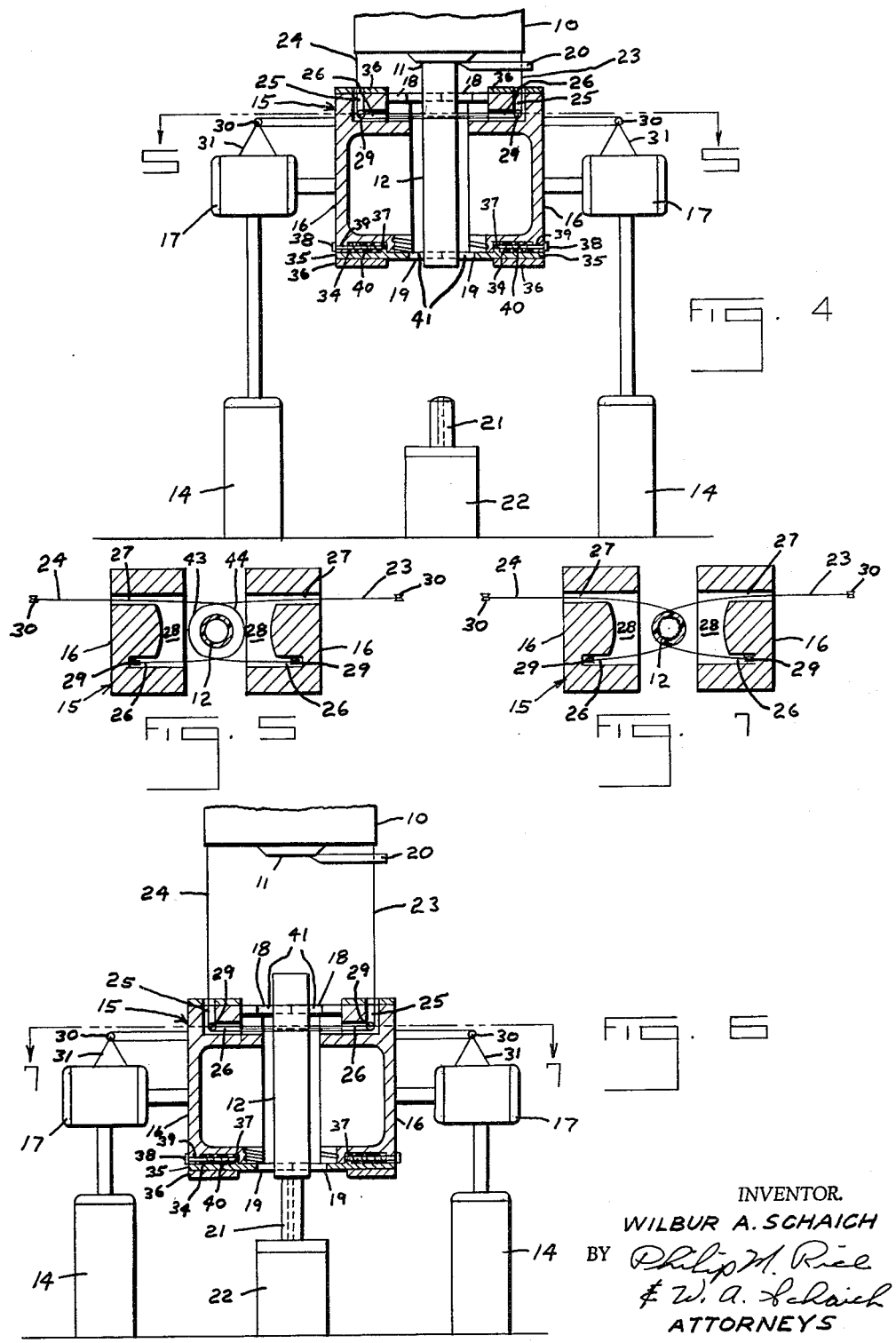

Nov. 9, 1965 W. A. SCHAICH 3,217,072
METHOD FOR MAKING PLASTIC ARTICLES
Original Filed Aug. 14, 1961 3 Sheets-Sheet 3
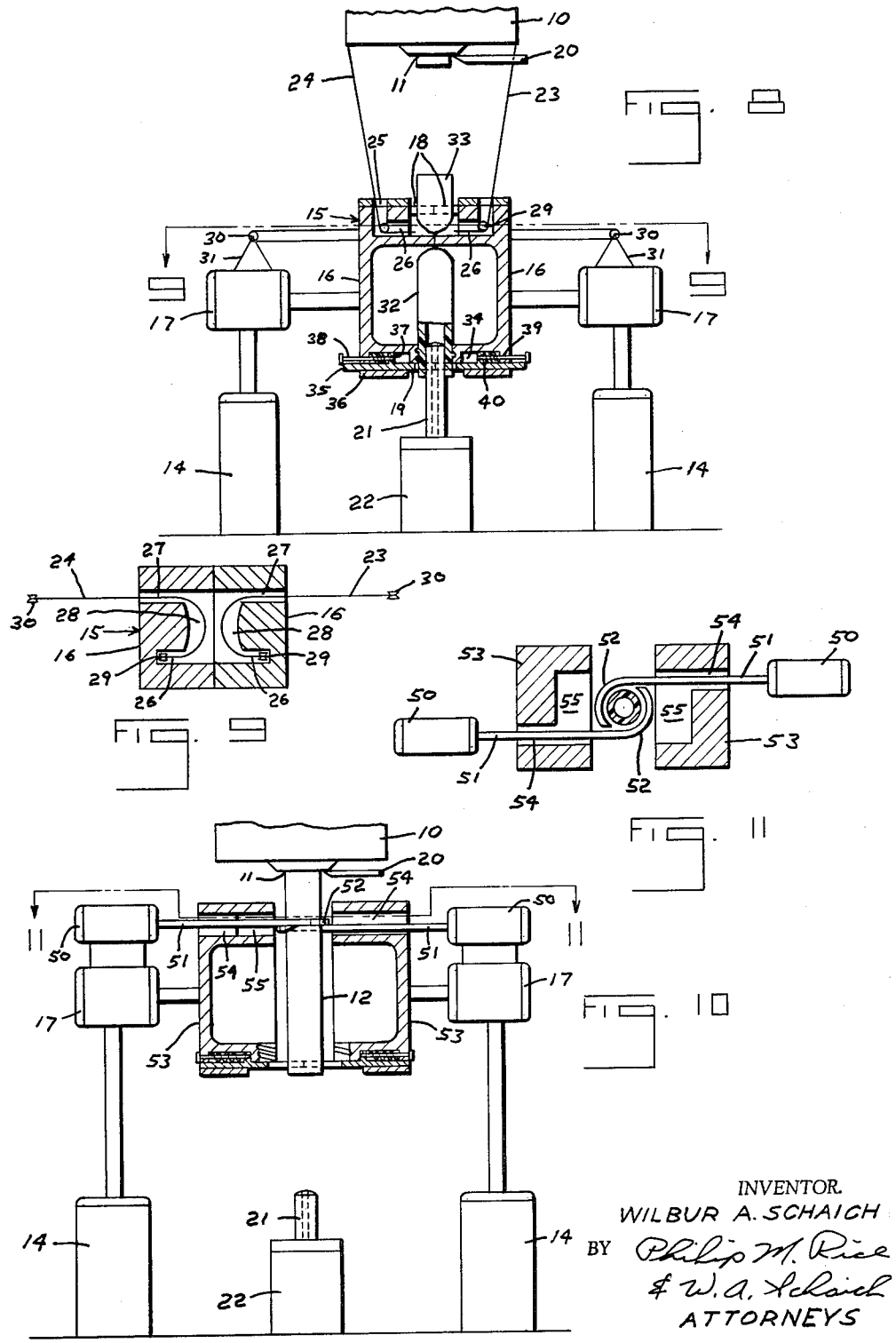
INVENTOR.
WILBUR A. SCHAICH
BY
ATTORNEYS United States Patent Office 3,217,072
Patented Nov. 9, 1965

3,217,072
METHOD FOR MAKING PLASTIC ARTICLES
Wilbur A. Schaich, Maumee, Ohio, assignor to Owens-Illinois Glass Company, a corporation of Ohio
Original application Aug. 14, 1961, Ser. No. 131,432, now Patent No. 3,160,690, dated Dec. 8, 1964. Divided and this application Feb. 26, 1964, Ser. No. 347,581
9 Claims. (Cl. 264—98)

This application is a division of application Serial Number 131,432, filed August 14, 1961, now Patent No. 3,160,690, dated December 8, 1964, entitled "Method for Making Plastic Articles," which is assigned to the common assignee.

This invention relates to an improved method of forming a blowable parison from a tubular formation of heated thermoplastic material which is subsequently to be blown in a mold cavity to form a hollow plastic article, and more particularly to the step of severing and sealing the tubular formation to form the blowable parison.

According to certain methods of forming hollow plastic articles, heated thermoplastic material is extruded through an annular orifice to form a tubular formation. This tubular formation may then be enclosed in the sections of a partible mold and then, upon closing of the molds, blown in the ensuing mold cavity, to form a hollow article corresponding to the contour of the mold cavity. According to many of the known methods, at least one end of the tubular formation is sealed when the sections of the partible mold come together to form the mold cavity and thereby pinch the tubular formation. Such pinching of the tubular formation results in an article having a tail which must be trimmed in order to produce the finished article.

Accordingly, it is an object of this invention to provide a method for forming plastic articles in completed form with no subsequent tail trimming required.

Besides the presence of the objectionable tail resulting from the pinching of the tubular formation by the edges of the partible mold sections, another inherent difficulty results from such pinching in that there will be concentration of plastic material in the wall or bottom along such pinched section. Such uneven distribution of material and the fact that the plastic material is clamped between the blow mold sections during the blowing operation and hence cannot be expanded results in a non-uniform wall thickness of the bottom of the blown article.

Therefore, it is a further object of this invention to provide a method of severing and sealing the tubular formation which will result in a more uniform wall thickness in the area of severing.

According to another known method of forming tailless hollow plastic articles, the tubing is extruded to a predetermined length; then a transverse wall is formed on the end of said length of tubing by retraction of the mandrel within the extrusion head, thereby permitting the heated thermoplastic material to flow around the end of the mandrel to form said transverse wall, which wall seals the end of said tubular formation. This method requires fairly complicated and expensive means for controlling the movement of the mandrel and the flow of the thermoplastic material.

Accordingly, it is still another object of this invention to provide a simple, inexpensive method whereby tailless hollow articles may be formed on conventional blow molding equipment.

A particular object of this invention is to provide an improved method and apparatus for end sealing a tubular formation of heated thermoplastic material by radially constricting a medial portion of said tubular formation around the majority of its periphery to concurrently move all wall portions of the constricted region into contiguous relation, thereby producing a puckered seal, and severing said tubular formation at said puckered seal to produce a blowable parison.

The above and other objects are capable of attainment by employing my invention which embodies among its features two loops of filamentary material encircling a tubular formation of heated thermoplastic immediately adjacent one end of a mold cavity, concurrently moving said loops in substantially opposite directions but in contiguous planes, thereby radially constricting the encircled portion of said tubular formation to concurrently move all wall portions of the constricted region into contiguous sealing relationship and continuing the relative movement of said loops to sever said tubular formation. Then, the resulting closed end parison, in recovering from the stresses induced therein during extrusion, will shrink axially a sufficient amount that the blow mold sections may close without pinching said parison.

The specific nature of this invention, as well as other objects and advantages thereof, will become apparent to those skilled in the art from the following detailed description taken in conjunction with the annexed sheets of drawings on which by way of preferred example only are illustrated the preferred embodiment of this invention.

In the accompanying drawings:

FIGURE 4 is an elevational schematic view partly in section of an automatically operable apparatus for carrying out the method of this invention, showing a length of tubular formation positioned between the open portions of a partible mold and held in position by tube grasping members;

FIGURE 5 is a cross-sectional view taken along line 5—5 of FIGURE 4;

FIGURE 6 is a view similar to FIGURE 4 showing the tubular formation disengaged from the orifice and the mold sections of the partible mold lowered to the blow pipe;

FIGURE 7 is a cross-sectional view taken along line 7—7 of FIGURE 6;

FIGURE 8 is a view similar to FIGURE 4 showing the tubular formation sealed and severed to form a parison portion and a waste portion and showing the sections of the partible blow mold in a closed position;

FIGURE 9 is a cross-sectional view taken along line 9—9 of FIGURE 8;

FIGURE 10 is an elevational schematic view of a modified apparatus utilizing a method of this invention; and FIGURE 11 is a view taken along line 11—11 of FIGURE 10.

Figure 1:
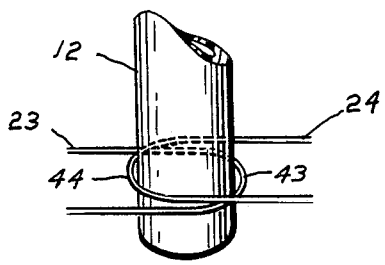
FIGURE 1 is a fragmentary perspective view showing schematically apparatus for carrying out the method of this invention, comprising a length of tubular formation surrounded by two loops of filamentary material, said loops lying in contiguous planes.
Figure 2:
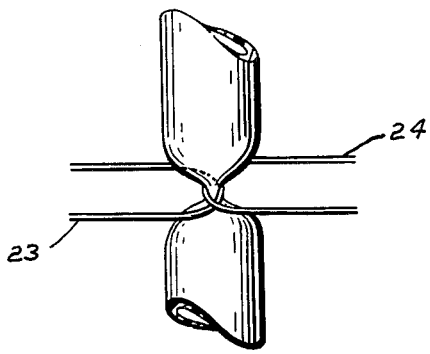
FIGURE 2 is a view similar to FIGURE 1 showing the loops moved in substantially opposite directions to radially constrict all wall portions of said tubular formation to form a sealed end.
Figure 3:
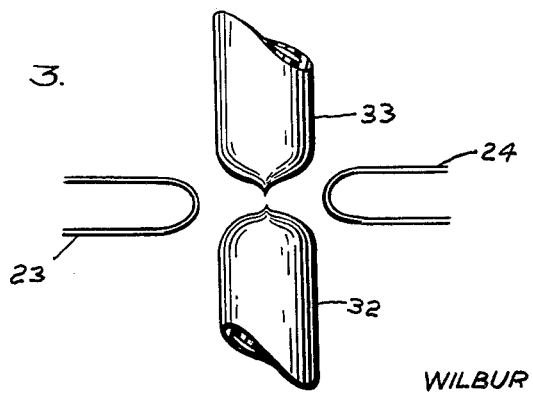
FIGURE 3 is a view similar to FIGURE 2 showing further movement of said loops to completely sever said tubular formation.

Referring to the drawings, there is shown in FIGURE 1 a length of tubular formation 12 of heated thermoplastic material such as polyethylene, two lengths of filamentary material 23 and 24, each of said lengths 23 and 24 forming a loop 43 and 44 respectively, said loops 43 and 44 lying in contiguous planes and cooperating to encircle tubular formation 12. In the first step of this invention, illustrated by FIGURE 1, loops 43 and 44 cooperate to loosely encircle tubular formation 12. In the next step, FIGURE 2, the loops 43 and 44 have been moved in substantially opposite directions. Such movement causes radial constriction of the encircled portion of tubular formation 12 by concurrently moving all wall portions of the constricted region into contiguous sealing relationship. In the next step, FIGURE 3, the continued relative movement of loops 43 and 44 severs tubular formation 12 to form a tail free parison portion 32 and a waste portion 33, each of said portions 32 and 33 being closed at the severed end by a puckered seal.

There is schematically shown in FIGURE 4 an automatic apparatus for accomplishing the methods of this invention comprising an extrusion head 10 provided with an orifice 11 through which heated thermoplastic material issues in the form of vertical tubing 12. A partible mold generally designated 15 is provided comprising mold sections or halves 16 which are capable of being opened or closed. As shown in FIGURE 4 the mold sections 16 are supported by horizontally disposed fluid pressure cylinders 17 which effect the opening and closing operation. The horizontally disposed fluid pressure cylinders 17 are in turn supported by vertically disposed fluid pressure cylinders 14 which power the vertical movements of cylinders 17 and mold sections 16 to and from orifice 11 as hereinafter noted.

Each of the mold sections 16 is provided with upper tube grasping members 18 and lower tube grasping members 19 of the type disclosed in patent application Serial No. 790,099, filed January 30, 1959, which is assigned to the assignee of this application. The top and bottom faces of the mold sections 16 are respectively utilized to mount the pairs of tube grasping members 18 and 19. Inasmuch as the mountings for the upper and lower tube grasping members 18 and 19 are identical, the mounting for the lower tube grasping members 19 only will be described.

The bottom faces of the mold sections 16 are respectively provided with elongated recesses 34. Each bottom grasping member 19 has a rectangular stem portion 35 slidably received in the corresponding recess 34 and is retained in such recess by a cover plate 36 which is secured to the corresponding mold section. An upwardly projecting lug 37 is formed on each grasping member 19 which receives the threaded end of a spring guide bolt 38 which passes into the mold recess 34 through a suitable aperture 39 in the end wall thereof. A spring 40 is mounted on the guide bolt 38 and functions to push the corresponding tube grasping member 19 to a forwardly projecting position relative to its corresponding mold segment. The top and bottom pairs of tube grasping members 18 and 19 each define a tube engaging notch 41 in their opposed vertical surfaces which notches when the grasping members are in abutment cooperate to engage and vertically support the extruded tubular formation 12.

Thus tubular formation 12 issues from orifice 11 and hangs freely pendant between the open mold sections 16. Horizontally disposed fluid pressure cylinders 17 partially close mold sections 16 to such a position that tube grasping members 18 and 19 engage tubular formation 12. A knife 20 is provided to sever tubular formation 12 near the orifice 11 in such manner as to have at least one of the severed ends open. This severing occurs immediately upon engagement of tubular formation 12 by tube grasping members 18 and 19. The length of the severed tubular formation is thus in excess of the length of the cavity of mold sections 16. Upon severing, vertically disposed fluid pressure cylinders 14 are actuated to lower the resulting length of tubular formation 12 away from extrusion head 10.

A blow pipe 21 is provided to slide into the bottom open end of tubular formation 12. Vertical movement of blow pipe 21 is controlled by a fluid pressure cylinder 22.

Referring now to FIGURES 4 and 5, there is shown two lengths 23 and 24 of filamentary material, such as piano wire for example, positioned in contiguous planes in such a manner as to form loops 43 and 44 which cooperate to encircle tubular formation 12 between the upper tube grasping members 18 and the upper end of the molding cavity. The top face of each of the mold sections 16 is provided with a vertical passage 25 and a horizontal passage 26 connecting therewith. Horizontal passage 26 lies in the direction of movement of the mold sections 16 and both it and vertical passage 25 are positioned in front of orifice 11. Another horizontal passage 27 is also provided in the top face of mold sections 16. Horizontal passage 27 is parallel with and in the same horizontal plane as horizontal passage 26. Horizontal passage 27 is located behind orifice 11.

A slot 28 is provided to connect horizontal passages 26 and 27. A pulley 29 is located at the juncture of vertical passage 25 and horizontal passage 26. Another pulley 30, supported by means of a bracket 31 connected to fluid pressure cylinder 17, is aligned with horizontal passage 27.

One end of the length 23 of filamentary material determining loop 43 is secured to extrusion head 10. The length 23 of filamentary material drops vertically from extrusion head 10, passes through vertical passage 25 around pulley 29, through horizontal passage 26, and is curved to form loop 43. It then passes through horizontal passage 27, around pulley 30, and returns to mold section 16 where it is secured. Length 24 is threaded through the other mold section in a similar manner.

Thus in operation, a length of extruded tubing 12 issues from orifice 11 when the mold sections 16 are in an open position. In this position, the loops 43 and 44 cooperate to define a closed loop which is sufficiently large to permit tubular formation 12 to pass freely through it. After the proper length of tubular formation 12 has been extruded, the mold sections 16 close slightly to the position shown in FIGURE 4 so as to bring both the top and bottom pairs of tube grasping members 18 and 19 into abutting relationship and hence into operative engagement with tubular formation 12. The severing knife 20 is then actuated by any suitable mechanism (not shown) to disengage the length of tubular formation 12 from extrusion head 10. Thus the tubular formation 12 depends on the tube grasping members 18 and 19 for support.

Immediately subsequent to the severing operation, the mold sections 16 and fluid pressure cylinders 17 are lowered by cylinders 14 to shift the severed length of tubular formation 12 to a position remote from orifice 11. The lowering of mold sections 16 causes loops 43 and 44 to move in substantially opposite directions thereby causing the enclosed loop formed by said loops 43 and 44 to become smaller until tubular formation 12 is encircled and radially constricted as shown in FIGURES 6 and 7. That this is the necessary result of lowering the mold sections 16 is obvious by virtue of the fact that one end of the lengths 23 and 24 is connected to the extrusion head 10 which remains stationary while the other end is attached to the mold sections 16.

As the molds approach the lower position, the blow pipe 21 is then raised by fluid cylinder 22 to enter the lower open end of the severed length of tubular formation 12. Then fluid cylinders 17 are actuated to fully close mold sections 16 as shown in FIGURES 8 and 9.

Inasmuch as one end of the respective lengths 23 and 24 is connected to extrusion head 10 while the other end is attached to the respective mold sections 16 as heretofore noted, the closing movement of mold sections 16 causes loops 43 and 44 to again move in substantially opposite directions to completely pull apart the enclosed loop thereby severing tubular formation 12. Such movement of loops 43 and 44 first causes all wall portions of the radially constricted encircled portion of tubular formation 12 to concurrently move into contiguous sealing relationship and then the continued relative movement causes the loops 43 and 44 to sever tubular formation 12 thereby forming a parison portion 32 and a waste portion 33. The parison portion 32 is thus closed at the severed end by a puckered seal which results from radially constricting the wall portions of the tubular formation 12 into contiguous relationship. Upon severing, the resulting waste portion 33 is blown away by a blast of air to prevent interference with subsequent operations.

The severing occurs sufficiently prior to completion of the mold closing step to provide opportunity for the parison portion 32 to shrink axially so that the top end thereof lies within the blow mold cavity. As disclosed in my copending application Serial No. 789,564, filed January 28, 1959, such shrinkage is caused by the recovery of the thermoplastic from the axial stresses induced in the tubular formation 12 during extrusion. Sufficient shrinkage is permitted to occur prior to closing of the blow mold so that the mold sections 16 close without pinching the sealed parison. With respect to the shrinkage, it will be obvious to anyone skilled in the art that such shrinkage will occur whether the parison is closed by a puckered seal as will result using the apparatus heretofore noted or is closed by any other type of seal, for example, such seal as would result if the parison were formed by severing the tubular formation by means of a pair of co-acting pinchers having straight edges. For example, the top tube holding members 18 could have confronting edges that seal and sever the tubular fromation. Therefore, it should be expressly understood that this feature of this invention is not limited to producing a parison with a puckered seal but rather includes any type of closed end parison from which a tailless hollow article may be blown regardless of the type of seal.

As previously noted, the mold sections 16 are provided with a slot 28 connecting horizontal passages 26 and 27. This slot 28 permits the mold sections to close without pinching loops 43 and 44. In other words, each of the loops 43 and 44 slide into its respective slot 28 as the mold sections 16 close as shown in FIGURE 9.

Thus with the apparatus positioned with the mold sections 16 closed and the blow pipe 21 inserted into the lower portion of the tubular formation 12, the tubular formation is then expanded by fluid pressure introduced through blow pipe 21 to the configuration defined by the cavity of the mold sections 16. After cooling and setting of the expanded thermoplastic material, the mold sections 16 are again opened, the tail-free hollow article formed therein is removed, and the apparatus returned to the position shown in FIGURE 4.

It is quite obvious that the method of severing herein provided by radially constricting all wall portions of the extruded tube will result in a much more uniform distribution of wall thickness in the bottom portion of the subsequently blown hollow article than in a method whereby the severing is accomplished by pinching the tubular formation with the straight edges of the mold sections because the seal area is unconfined and subject to expansion by the blowing fluid. More important, the hollow article thus formed does not require a subsequent tail trimming operation as is necessary in most conventional methods of blowing hollow articles.

Referring now to FIGURES 10 and 11, there is shown a further modification of this invention whereby the tube constricting and severing members are controlled by fluid cylinders acting independently of any movement of the mold sections. In this modification, except as hereinafter noted, the basic apparatus is essentially the same as that previously discussed. The exceptions are first, in the example as shown, no filamentary material is used; however, this modification could easily be used with the filamentary material rather than the material as hereinafter noted. The other exception is that the mold sections need tube grasping members only at the bottom. Therefore, fore this modification the mold sections will be referred to as number 53. All other members of the apparatus will be referred to by the same respective numbers as previously.

In the modified application, there is shown fluid pressure cylinders 50 on each side of the extrusion head 10. Each of the cylinders 50 is supported on one of the cylinders 17 in order that its relative vertical position with mold sections 53 is always constant. A supporting section 51 extends from each of the cylinders 50. The supporting section 51 terminates at its free end in a thin arcuate section 52. The respective arcuate sections 52 move in opposite directions in contiguous planes to encircle tubular formation 12. The movement of the arcuate sections 52 is powered by the fluid pressure cylinders 50.

Mold sections 53 are each provided with a horizontal passage 54 through their respective top faces immediately adjacent, but not within, the mold cavity. Supporting section 51 passes through horizontal passage 54. A slot 55, in which arcuate sections 52 may be positioned when the mold sections 53 are closed, is also provided in order to permit said mold sections 53 to close unobstructed.

At the beginning of the cycle, supporting sections 51 will be in their most extended position so that tubular formation 12 issuing from orifice 11 may extend freely between arcuate sections 52. After the proper length of tubing 12 has been extruded, supporting section 51 will be retracted slightly by means of fluid pressure cylinders 50 thereby causing arcuate sections 52 to move in opposite directions a sufficient distance to engage and thereby support tubular formation 12 but not to sever it. The bottom end of tubular formation 12 is supported by tube grasping members 19 as in the previous example. Then the knife 20 is actuated to sever the tubular formation 12 near the extrusion head 10. Next the tubular formation 12, supported at the top by arcuate sections 52 and at the bottom by tube grasping members 19, is lowered to a position remote from orifice 11. After blow pipe 21 is raised to enter the lower open end of tubular formation 12, fluid pressure cylinders 50 are actuated to further retract supporting sections 51. Such retraction causes the arcuate sections 52 to radially constrict and then completely sever extruded tubular formation 12 thereby forming a parison portion and a waste portion as in the previous example. The severing occurs a sufficient time prior to the closing of mold sections 53 to permit the parison portion to shrink axially a sufficient amount that the mold sections 53 will not pinch it. The subsequent expansion of the parison portion in the mold cavity is similar to that previously described in the preceding example.

In this modification, although the supporting section 51 may be of any preferred cross-section, the arcuate sections 52 should preferably be fairly thin; however, they preferably should not have sharp edges as it is necessary to produce a seal prior to the completion of the severing operation.

I claim:

1. The method of forming tail-free hollow plastic articles by expanding in a partible blow mold a tubular formation of heated thermoplastic material comprising the steps of severing a length of said tubular formation in excess of the length of the cavity of said blow mold, sealing one end of said tubular formation, permitting said tubular formation to axially shrink so that said sealed end will be within the blow mold cavity, closing said blow mold on said tubular portion without pinching said sealed end, and expanding the tubular portion to conform to the blow mold cavity.

2. The method of forming hollow plastic articles from a tubular formation of heated thermoplastic material comprising positioning said tubular formation between the open halves of a blow mold, said halves defining a molding cavity when closed, sealing the tubular formation near one end of the molding cavity, severing the tubular formation at said seal to produce a parison portion and a waste portion, permitting said parison portion to shrink to the extent that the sealed end thereof lies within the molding cavity, closing said blow mold halves around said parison portion, and expanding said parison portion to conform to said mold cavity.

3. The method of forming hollow plastic articles from a tubular formation of heated thermoplastic material comprising positioning said tubular formation vertically between the open halves of a blow mold, said halves defining a molding cavity when closed, sealing said tubular formation in the vicinity of the upper end of said molding cavity, severing said tubular formation at the seal to produce a parison portion and a waste portion, permitting said parison portion to shrink vertically a sufficient amount that the sealed end thereof is lower than the uppermost surface of said molding cavity, closing said blow mold halves around said parison portion, and expanding said parison portion to conform to said mold cavity.

4. The method of forming a hollow plastic article comprising the steps of extruding a length of heated thermoplastic tubing from an extrusion head, positioning said tubing between the open halves of a blow mold, said halves defining a molding cavity when closed, moving said tubing and said mold halves to a position remote from said extrusion head, sealing the tubing near one end of the molding cavity, severing the tubing adjacent said seal to produce a parison closing said mold halves around said parison without pinching the sealed end thereof, and expanding said parison to conform to said mold cavity.

5. An apparatus for forming hollow plastic articles comprising an extrusion head from which heated thermoplastic material issues in the form of tubing, a pair of mold halves which when closed define a mold cavity, two loop elements cooperating to substantially encircle said tubing in contiguous planes near one end of said mold cavity, means for moving said loop elements in substantially opposite directions to radially constrict all wall portions of said tubing to, first, form a seal, and then, to sever said tubing at said seal to form a parison, means for closing said mold halves around said parison without pinching said sealed end of said parison, and means for expanding said parison in said mold cavity.

6. An apparatus for forming hollow plastic articles comprising an extrusion head having an orifice through which heated thermoplastic material issues in the form of tubing, a pair of mold halves which when closed define a mold cavity, means for supporting said tubing between said open mold halves, means for severing said tubing near said orifice, two loop elements cooperating to substantially encircle said tubing in contiguous planes near one end of said mold cavity, means for moving said loop elements in substantially opposite directions to radially constrict all wall portions of said tubing to, first, form a seal, and then, to sever said tubing at said seal to form a parison, means for closing said mold halves around said parison without pinching said sealed end of said parison and means for expanding said parison in said mold cavity.

7. The method of forming a hollow plastic article from a tubular formation of heated thermoplastic material comprising positioning said tubular formation between the open halves of a blow mold, said halves defining a molding cavity when closed, constricting that portion of said tubular formation lying in the vicinity of one end of the molding cavity around the majority of its periphery to radially inwardly displace the wall portions thereof to produce a puckered seal, severing said tubular formation at the seal to produce a parison portion and a waste portion, closing said blow mold halves around said parison portion without pinching the seal, and expanding said parison portion to conform to said molding cavity.

8. The method of forming hollow plastic articles comprising the steps of positioning a tubular formation of heated thermoplastic material between the open halves of a blow mold, said halves defining a molding cavity when closed, radially constricting a medial portion of said tubular formation around the majority of its periphery to concurrently move all wall portions of the constricted region into contigious relation to produce a puckered seal, said seal lying outside of said molding cavity, severing the tubular formation at said seal to produce a parison portion and a waste portion, permitting said parison portion to shrink axially to the extent that the sealed end thereof lies within the molding cavity, closing the blow mold halves around said parison portion without pinching said seal, and expanding said parison portion to conform to said molding cavity.

9. The method of forming hollow plastic articles comprising the steps of positioning a tubular formation of heated thermoplastic material between the open halves of a blow mold, said halves defining a molding cavity when closed, sealing said tubular formation near one end of the molding cavity so that the seal thus formed lies outside of the molding cavity, severing the tubular formation at said seal to produce a parison portion and a waste portion, permitting said parison portion to shrink axially to the extent that the sealed end thereof lies within the molding cavity, closing the blow mold halves around said parison portion without pinching said seal, and expanding said parison portion to conform to said molding cavity.

References Cited by the Examiner
UNITED STATES PATENTS

| | | | |
|---|---|---|---|
| 2,930,079 | 3/60 | Parfrey | 264—99 |
| 2,940,121 | 6/60 | Sherman | 18—5 |
| 2,975,473 | 3/61 | Hagen et al. | 264—99 |
| 3,001,239 | 9/61 | Santelli et al. | 264—98 |

ROBERT F. WHITE, *Primary Examiner.*